United States Patent [19]

Ekkert

[11] Patent Number: 5,792,414
[45] Date of Patent: Aug. 11, 1998

[54] METHOD OF MANUFACTURING A CONTAINER WITH IMPROVED WALL UNIFORMITY AND REDUCED MATERIAL

[75] Inventor: Len Ekkert, Lemont, Ill.

[73] Assignee: Phoenix Closures, Inc., Naperville, Ill.

[21] Appl. No.: 705,318

[22] Filed: Aug. 29, 1996

[51] Int. Cl.$^6$ .................................................. B29C 49/04
[52] U.S. Cl. .......................... 264/520; 264/536; 264/540; 425/525; 425/532
[58] Field of Search ................................ 264/533, 536, 264/540, 520; 425/525, 532

[56] References Cited

U.S. PATENT DOCUMENTS

| | | | |
|---|---|---|---|
| 3,410,937 | 11/1968 | Winchester, Jr. | 264/533 |
| 3,531,556 | 9/1970 | Mehnert | 264/536 |
| 3,949,034 | 4/1976 | Uhlig | 264/536 |
| 4,540,542 | 9/1985 | Weiler | 264/536 |

*Primary Examiner*—Catherine Timm
*Attorney, Agent, or Firm*—Welsh & Katz, Ltd.

[57] ABSTRACT

A method of manufacturing a container, wherein less material is required to produce the container, the container has a more uniform wall thickness, and malformations around the neck of the container are significantly reduced. The method includes forming plastic into a parison and blowing it into a mold having a tapered neck portion and a body portion, which join to form an annular corner for contacting the parison. A blow pin blows air into the mold and parison, causing the parison to expand and conform to the inner contour of the mold. The taper of the neck portion and the annular corner thereby formed, cool the plastic at that point and more uniformly form the parison into the container, the amount of material wasted and required in manufacturing the container is substantially reduced, as is malformations and warping which usually occur about the neck of the finished container.

2 Claims, 1 Drawing Sheet

METHOD OF MANUFACTURING A CONTAINER WITH IMPROVED WALL UNIFORMITY AND REDUCED MATERIAL

BACKGROUND OF THE INVENTION

The use of plastic bottle containers is prevalent in today's retail market. For instance, common household items, such as laundry detergent and other soaps, are commonly packaged in plastic bottles. Additionally, food items such as milk, juices and other liquids are also often packaged in plastic bottles. In fact, plastic bottles can be utilized to package virtually an unlimited array of goods.

The benefits of using plastic bottles to package goods are well known. For instance, plastic containers are usually very durable while also being light in weight. Plastic can also be recycled to help conserve the environment. Plastic bottles are relatively less expensive to produce than some of the other types of containers due to processes which have been developed, such as blow-molding.

It is not uncommon for plastic bottle manufacturer to produce large quantities of different bottle types. Therefore, even a relatively small reduction in the amount of material used for each bottle would have significant and long ranging economic effect.

While the process of plastic bottle manufacturing has progressed, there are still problems which have not been addressed. In a typical process, plastic is heated in an extruder which extrudes a tubular stream of plastic. A container mold, corresponding to the shape of the desired bottle, closes around the outer part of the tubular stream of plastic. A blower is inserted near the top of the mold and blows pressure into the mold, creating pressure which pushes the tubular plastic stream outward along the contour of the inside of the mold. In this manner, the plastic stream is shaped and cooled to produce the desired plastic container. While this process is acceptable, there still remain problems which detract from its overall utility.

One problem with this process is that there is sagging or malformation around the neck of containers made in this conventional way. Significant factors causing this malformation problem are the uneven cooling of the plastic stream and the unneeded concentration of the plastic material around the neck portion during the manufacturing process.

In a typical mold for a plastic container with a neck structure, the mold has a neck portion and a body portion, the neck portion generally being of a smaller diameter than the body portion. It is desirable to have the outer wall of the neck of the finished container as uniformly perpendicular to the horizontal plane as possible so that a cap or other closure device can be secured to the finished container's neck. Therefore, the neck portion of the mold comprises an annular wall which is perpendicular to the horizontal plane.

As the mold halves close together around the plastic stream, the heated plastic stream first contacts the neck portion of the mold. This action aligns and cools the plastic within the mold by contacting it with the entire annular wall of the neck portion. While the alignment of the plastic stream is beneficial, the contact with the annular wall and the consequential cooling of the plastic is not.

The cooling of the plastic contacting the annular wall of the neck portion causes the plastic to harden before the blow pin applies pressure into the mold. Therefore, when the blow pin blows, the partially hardened plastic around the neck is pushed down by the air, but is not uniformly distributed as the remaining portions of the plastic stream which have not cooled to this extent. This problem results in a finished container which has a unneeded and uneven concentration of plastic material around the neck of the finished container.

In addition to the wasted material around the container neck, the concentration of plastic material around the neck also results in malformations, especially along the inside of the container neck around the bottom. In applications where the lower inside portion of the container neck is utilized for sealing purposes, such as in conventional spout assemblies used to package laundry detergents, such malformations and uneven surface and diameter of the neck will compromise the container's ability to seal effectively.

SUMMARY OF THE INVENTION

Accordingly, it is an object of the present invention to overcome the sealing problems of the conventional containers and methods for making same. More specifically, it is an object of the present invention is to provide a container which has a more uniform distribution of plastic throughout the entire container, and to provide a method for making same.

Another object of the present invention is to provide a method for making a plastic container which reduces the cost of producing such containers by reducing the amount of material required.

A further object of the present invention is to provide a container which has a better container neck formation, and to provide a process for making same, thus improving a container's sealing properties.

In accordance with the present invention, all of these objects, as well as others not herein specifically identified, are achieved generally by the present container and method of making same. The method involves heating and coextruding plastic material into a tubular section. The tubular section is enclosed within a mold, which consists of a body portion and a neck portion. The neck of the mold is tapered to have a greater inner diameter near the top as opposed to the bottom of the neck portion. Pressure is then applied, by a blow pin, into the mold through the neck portion to cause the tubular section to expand and cool along the inside of the mold.

BRIEF DESCRIPTION OF DRAWINGS

Further objects of the invention, taken together with additional features contributing thereto and advantages occurring therefrom, will be apparent from the following description of the invention when read in conjunction with the accompanying drawings, wherein.

DETAILED DESCRIPTION OF THE PREFERRED EMBODIMENTS

Figure 1:
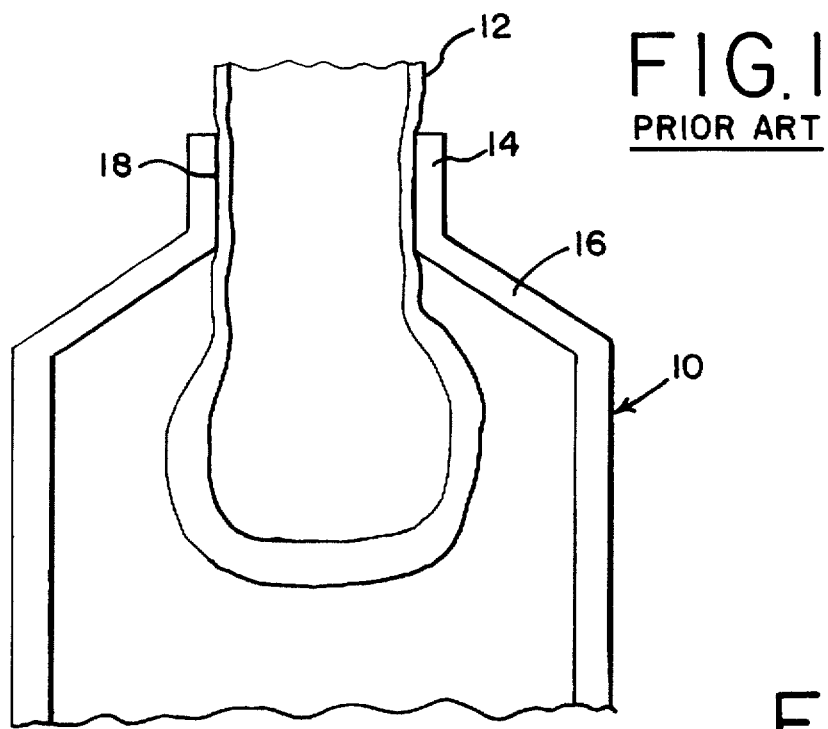
FIG. 1 is a side sectional view of a conventional container mold enclosing a parison.

FIG. 1 depicts a mold 10 and tubular plastic section 12 as conventionally used to manufacture a plastic container. The mold, generally designated as 10, is usually divided into two identical halves which can be joined together to create a hollow structure. The mold 10 consists of two portions, a neck portion 14 and a body portion 16 which define the shape of the container that will be produced. In the conventional mold 10, the annular wall 18 defining the neck portion 14 is perpendicular to the horizontal plane. The perpendicular orientation of the outer wall of a container neck is generally desirable and facilitates the utilization of various closure means which perform best when the outer wall of the container neck is perpendicular to the horizontal plane.

As can be seen in FIG. 1, the mold 10 is closed about the parison 12 and the neck portion 14 of the mold 10 contacts a corresponding portion of the parison 12, not only aligning the parison 12, but also causing the various drawbacks as discussed previously.

Figure 2:
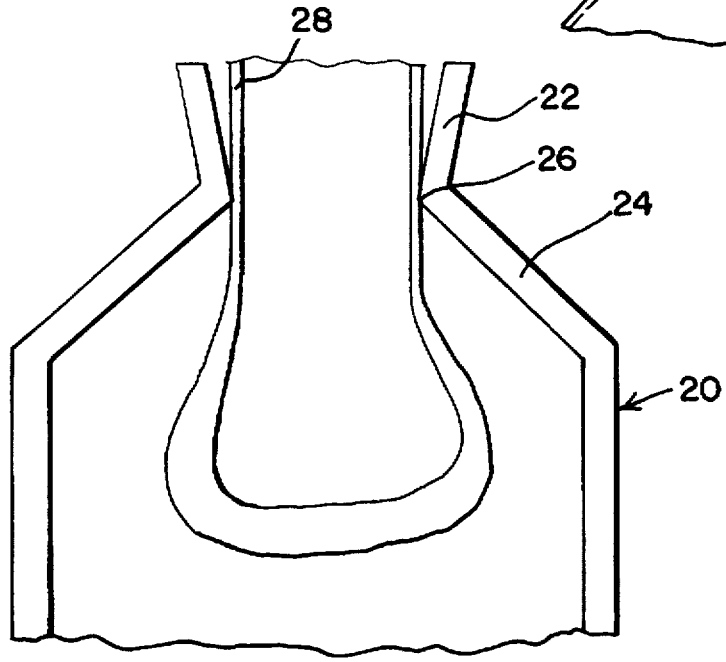
FIG. 2 is a side sectional view of a container mold enclosing a parison in accordance with the present invention.

The previously mentioned problems are addressed and corrected by the present invention, now referring to FIG. 2, which utilizes a mold generally designated as 20. The mold 20, consists of a neck portion 22 and a body portion 24. The body portion 24 is similar to the conventional body portion 16 described previously. However, the neck portion 22 is tapered to have a greater inner diameter near the upper end of the neck portion 22 than its lower end. Therefore, that point at which the neck portion 22 and body portion 24 join, protrudes further into the center of the mold 20 than any other part of the mold 20 and creates an annular edge 26.

When the mold 20 closes on the parison 28, the annular edge 26 contacts the parison 28, thus aligning and pinching the parison 28 inwardly. A blow pin 30 is introduced at the top of the mold 20 to blow air into the parison 28 and blow to shape the parison in the mold. The blowing action causes the parison 28 to expand and conform to the contour of the inside of the mold 20 as known in the art.

When in the process of blowing the parison 28 begins to conform to the mold 20. It is important to note that the parison 28 is pinched at the annular edge 26 of the mold 20. Because the plastic of the parison is cooler where it touches the mold at 26 then in the interior to the mold where little or no contact is made, thus maintaining a higher temperature of the parison there. Thus, pinching the parison 28 near the annular edge, has the effect of thinning the plastic in that area. The taper of the inner wall 32 of the neck portion 22 of the mold 20 in conjunction with the pinching at the annular edge 26, causes the plastic tubular section 28 to have a greater thickness at the top of the neck portion than at bottom of the neck portion.

Figure 3:
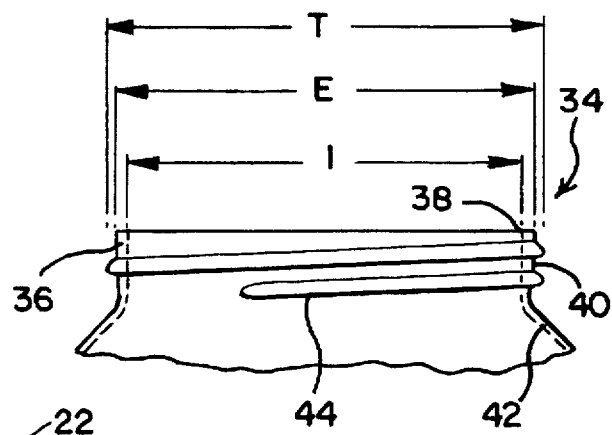
FIG. 3 is a sectional view of a finished container produced in accordance with the present invention further depicting threads on the neck of the container.

FIG. 3 shows a finished container, generally designated as 34, made in accordance with the method described herein. The finished container 34 has a neck 36 defined by an inner wall 38 and an outer wall 40, and a body 42. The container 34 may also be provided with threads 44 to secure a closure means onto the container neck 36. It should be noted that I, a line parallel with the inside neck is perpendicular to a horizontal, T, the plane of the outside diameter of the threads, is parallel to I, i.e., perpendicular to horizontal, and E, the plan of the outside neck finish of the bottle is tapered, increasing in diameter from bottom to top.

It was discovered that the present process of manufacturing a plastic container 34 resulted in many benefits. The material required to produce a container 34 was significantly reduced, sometimes as much as a ten percent (10%) reduction in material. It was also discovered that a much better container neck 36 structure was achieved, significantly reducing not only the material required to form the neck 36, but also substantially eliminating the malformations, or sagging, commonly found near the lower inside portion of the container neck 36. An explanation of how these benefits are achieved is presented in the foregoing paragraphs.

As was previously mentioned, the pinching of the parison 28 stretches the plastic material where the annular edge 26 contacts the parison 28. This stretching thins the plastic material before the blowing occurs, thereby reducing the amount of plastic accumulation near the juncture of the neck 36 and body 42 of the finished container 34.

Additionally, by pinching only an annular ring around the parison gob 28, as opposed to contacting the entire neck portion 22 onto the corresponding parison gob 28, less of the parison gob 28 is cooled and hardened before the blow pin 30 is utilized to shape the parison gob 28 into a bottle. The pinching, therefore allows more of the parison 28 to remain heated, thus promoting a more uniform expansion of the parison gob 28 during blowing. During actual blowing, the uniform pressure exerted onto the expanding parison gob 28 causes to the plastic material to distribute evenly. Thus the area which was pinched before the blowing process, will eventually have the same wall thickness as the rest of the container 34 after the blowing is done.

Due to the taper in the inner wall 32 of the neck portion 22, the annular wall defining the neck 36 of the finished container 34 will likewise be tapered. The uniform pressure applied by the blow-pin generally causes the plastic in the neck portion 22 to have a non-tapered or perpendicular inner wall 38. This results in a finished neck portion which has a tapered outer wall 40, but a perpendicular inner wall 38. Although there will be some taper in the outer wall 40 of the finished container neck 36, the taper will be slight due to the physical properties of plastics. As can be seen from FIG. 3, the wall thickness of the container neck 36 is greater near the top. As the container 34 cools after ejection from the mold 20, the neck 36 contracts more near the top of the neck 36 than the bottom since there is more plastic near the top. More contraction near the top compensates for the taper created by the mold 20 so that the actual taper in the finished container 34 is slight and unnoticeable.

Also shown in FIG. 3 are neck threads 44, which can be used to secure a corresponding cap onto the container neck 36. The threads 44 increase in outer extension along a downward gradient. The threads 44 will be most effective when they extend to a uniform outer diameter as shown by the horizontal boundary line T. The threads 44 can be incorporated into the neck portion 22 of the mold 20 for the container 34.

Different materials have their own unique physical properties which will provide guidance on exactly how much taper should be used. However, the Applicant has discovered that most applications require the angle A to be between 1 and 6 degrees. In most applications, Applicant has and preferably a 3 degree taper in the mold and, thus, in the neck finish of the bottle (E in FIG. 3).

In addition to the taper, the optimal temperature to which the plastic is heated and the amount of pressure used to blow the parison 28 will also vary according to the specific properties of the material used. However, Applicant has also found that approximately 140 pounds per square inch (PSI) exerted by the blow-pin works well for most applications, along with a plastic temperature of approximately 310 to 320 degrees.

The foregoing specification describes only the preferred embodiment of the invention as shown. Other embodiments besides the one herein shown and described may be articulated as well, the terms and expressions therefore serve only to describe the invention by example only and not to limit the invention. It is expected that others will perceive differences which, while differing for the foregoing, do not depart from the spirit and scope of the invention herein described and claimed.

What is claimed is:

1. A method of forming a container from plastic, comprising the steps of:

heating and forming the plastic into a parison;

enclosing said parison within a mold, said mold comprising a body portion and a neck portion having a top end and a lower end, said neck portion being tapered such that an inner diameter of said top end is greater than an inner diameter of said lower end, said neck portion defining an annular edge with said body portion;

blowing areas into said parison to shape said parison within said mold;

contacting, and pinching said parison with said annular edge so that said parison is contacted substantially only by said annular edge said contact substantially centering said parison within said neck portion of said mold, said pinching thereby stretching ad-thinning the parison at the annular edge;

cooling said parison at said annular edge;

completing the formation of said container by conforming the plastic to said mold by blowing the plastic in the parison proportionally more in said body portion than in said neck portion thereby distributing plastic in said mold.

2. The method as described in claim 1 wherein the plastic is heated to a temperature within the range of 310° to 320 degrees Fahrenheit.

* * * * *